United States Patent
Lee et al.

(10) Patent No.: US 7,733,809 B2
(45) Date of Patent: Jun. 8, 2010

(54) APPARATUS FOR DATA AGGREGATION USING ZONE SCHEDULING IN WIRELESS SENSOR NETWORK AND METHOD THEREOF

(75) Inventors: Jin Wook Lee, Yongin-si (KR); Su-Myeon Kim, Suwon-si (KR); Sun Shin An, Seoul (KR); Won Keun Kong, Suwon-si (KR); Hun Lim, Yongin-si (KR); Kyung Soo Lim, Seoul (KR); Sang Bin Lee, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 337 days.

(21) Appl. No.: 11/892,474

(22) Filed: Aug. 23, 2007

(65) Prior Publication Data

US 2008/0191868 A1 Aug. 14, 2008

(30) Foreign Application Priority Data

Feb. 8, 2007 (KR) ...................... 10-2007-0013158

(51) Int. Cl.
*H04W 24/00* (2009.01)
(52) U.S. Cl. ..................................... 370/256
(58) Field of Classification Search .................. 370/254, 370/255, 256
See application file for complete search history.

(56) References Cited

U.S. PATENT DOCUMENTS

2007/0076731 A1* 4/2007 Manjeshwar et al. ........ 370/408
2009/0085769 A1* 4/2009 Thubert et al. ......... 340/870.07

FOREIGN PATENT DOCUMENTS

| KR | 10-2006-0055635 | 5/2006 |
| KR | 10-2006-0075797 | 7/2006 |
| KR | 10-2007-0012045 | 1/2007 |
| KR | 10-2005-0124688 | 3/2007 |

* cited by examiner

*Primary Examiner*—Melvin Marcelo
(74) *Attorney, Agent, or Firm*—NSIP Law (57) ABSTRACT

A data aggregation method and data aggregation apparatus are provided. More particularly the data aggregation method includes: generating a plurality of data aggregation trees according to connection relationships between clusters that constitute a sensor network using a geographical code (GGC), selecting a single activation zone for each of the clusters which configures each of the plurality of data aggregation trees, selecting a maximum energy tree having a maximum total residual energy from the plurality of data aggregation trees, based on the single activation zone, and generating a tree list including activation zone information which corresponds to the maximum energy tree, and information about the maximum energy tree.

23 Claims, 8 Drawing Sheets

APPARATUS FOR DATA AGGREGATION USING ZONE SCHEDULING IN WIRELESS SENSOR NETWORK AND METHOD THEREOF

CROSS-REFERENCE TO RELATED APPLICATIONS

This application claims the benefit of Korean Patent Application No. 10-2007-0013158 filed on Feb. 8, 2007, in the Korean Intellectual Property Office, the entire disclosure of which is hereby incorporated by reference. Reference is also made to Korean Patent Application No. 10-2007-0012899 filed on Feb. 7, 2007, which corresponds to U.S. patent application Ser. No. 11/822,473 filed on Jul. 6, 2007, currently pending, and which is also hereby incorporated by reference.

BACKGROUND OF THE INVENTION

1. Field of the Invention

The present invention relates to a wireless sensor network of sensor nodes and zones. More particularly, the present invention relates to a data aggregation apparatus and method using the apparatus which can easily recognize location information of all sensor nodes, and which can apply the location information to expand a network by aggregating data using zone scheduling on a wireless sensor network.

2. Description of Related Art

A wireless sensor network refers to a network (e.g., a wireless mesh network) including tens to several thousands of sensor nodes capable of communicating with each other using a radio frequency (RF) to sense physical space, the network being spread over a wide area. Due to development of a sensor technique, technology for a microelectromechanical system (MEMS) can be connected via a wireless network and is embracing low power electronics engineering technology, low power RF planning technology, and the like. As a result, miniature sensor nodes are being developed that operate at low power levels and have low costs.

A large number of sensor nodes are formed within the same domain or a similar domain of interest to form a wireless sensor network, and may be applied to various applications such as health management, military, home networking, environmental monitoring, factory management, and disaster management. The locations of the sensor nodes are not required to be predetermined in the wireless sensor network, therefore the sensor nodes may be arbitrarily located and may be applied to areas difficult to access, such as in disaster rescue areas.

When a security network is configured in a wireless sensor network, a sensor surveilling burglar's movement and a sensor sensing open/close status of an entrance door are used as the sensor nodes, and the sensor nodes sense the burglar's movement or the open/close status of the entrance door, and the sensor nodes wirelessly transmit the burglar's movement or the open/close status of the entrance door to a control apparatus.

Protocols in the sensor network have an ability of self-organizing, and sensor nodes operate by cooperating with each other.

In the wireless sensor network, a large number of sensor nodes may be located in the region of interest without a predetermined arrangement. The wireless sensor network has an advantage in that overall operation of a network is not affected when a predetermined sensor node fails and no longer functions since neighboring sensor nodes sense similar information.

However, the wireless sensor network has drawbacks of low speed wireless media transmission, frequent transmission errors, a limited power supply, and difficulty in replacing the sensor nodes due to arbitrary distribution of the sensor nodes. Since a lifetime of the wireless sensor network is determined by a lifetime of a battery of the sensor nodes, an operation lifetime is required to be extended as long as possible to extend the lifetime of the the wireless sensor network. Thus, protocols for the wireless sensor network are needed to improve the lifetime of an entire system and to cope with dynamic changes of the wireless sensor network by distributing energy consumption within the entire network.

Accordingly, there is a need for an apparatus and method which can effectively improve the lifetime of the wireless sensor network.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a data aggregation apparatus and method using the apparatus which can improve a lifetime of an entire network since any single zone selectively transmits data using zone scheduling, from a plurality of zones configuring clusters.

An aspect of exemplary embodiments of the present invention also provides an apparatus and method to improve a lifetime of an entire network since a single zone, from a plurality of zones configuring clusters, transmits data using zone scheduling.

An aspect of exemplary embodiments of the present invention also provides an apparatus and method to easily understand location information of all sensor nodes by assigning information of a geographical code (GGC) to each of a plurality of sensor nodes configuring a zone.

An aspect of exemplary embodiments of the present invention also provides an apparatus and method able to be easily applied to expand a network since a wireless sensor network is configured with a plurality of clusters, the plurality of clusters are configured with a plurality of zones, the plurality of zones are configured with a plurality of sensor nodes by hierarchically configuring a wireless sensor network using clusters, zones, and sensor nodes.

According to an aspect of exemplary embodiments of the present invention, there is provided a data aggregation method including: generating a plurality of data aggregation trees according to a connection relationship of clusters of sensor nodes which configures a wireless sensor network using a geographical code (GGC), selecting a single activation zone for each of the clusters which configures each of the plurality of data aggregation trees, selecting a maximum energy tree having a maximum total residual energy from the plurality of data aggregation trees based on the single activation zone, and generating a tree list including activation zone information which corresponds to the maximum energy tree, and information about the maximum energy tree.

According to an aspect of exemplary embodiments of the present invention, there is provided a data aggregation apparatus including: a tree generation unit for generating a plurality of data aggregation trees according to an association of clusters which configures a wireless sensor network using a geographical code (GGC), a zone scheduling unit for selecting a single activation zone for each of the clusters which configures each of the plurality of data aggregation trees, a tree selection unit for selecting a maximum energy tree having a maximum total residual energy, from the plurality of data aggregation trees based on the activation zone, and a list generation unit for generating a tree list including activation zone information which corresponds to the maximum energy tree, and information about the maximum energy tree.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
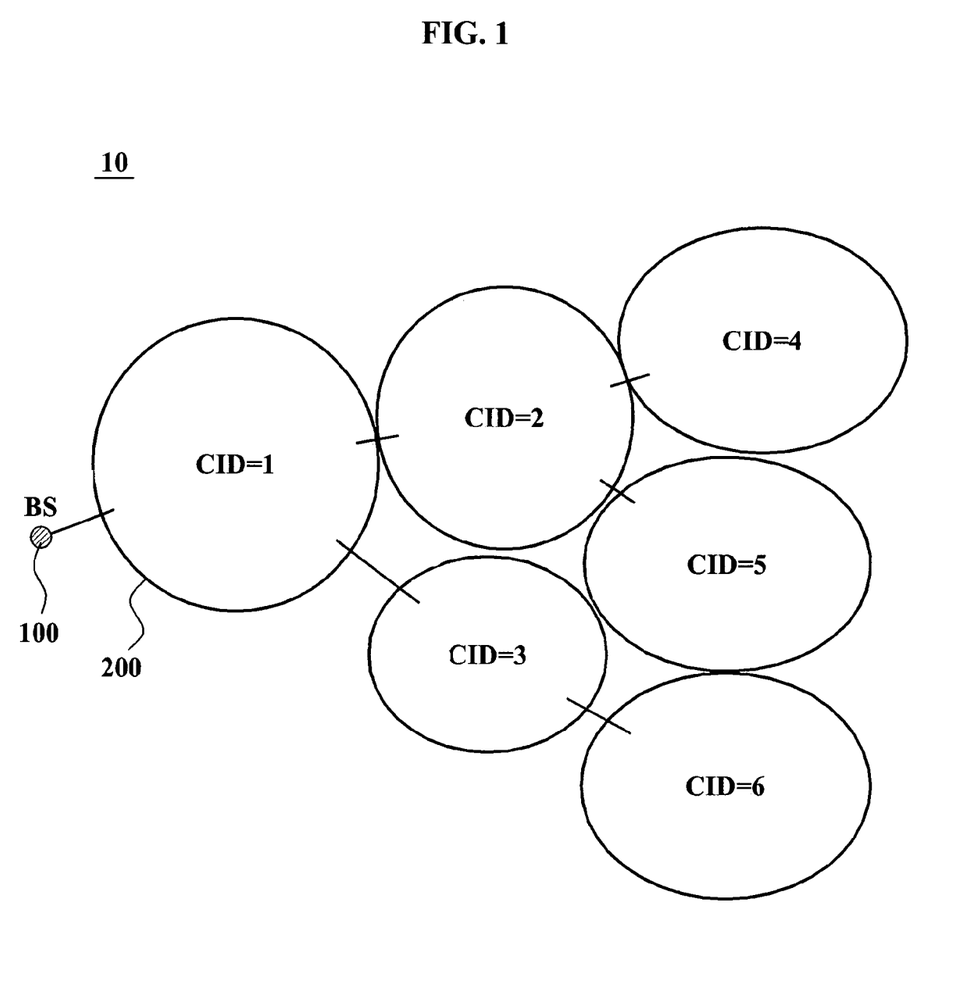
FIG. 1 is a configuration diagram illustrating a wireless sensor network according to an exemplary embodiment of the present invention.

FIG. 1 is a configuration diagram illustrating a wireless sensor network according to an exemplary embodiment of the present invention.

As illustrated in FIG. 1, the wireless sensor network 10 according to the exemplary embodiment of the present invention may include a base station 100 and a plurality of clusters 200.

The base station 100 may control the plurality of clusters 200 to aggregate data from the plurality of clusters 200.

A cluster 200 corresponds to the largest unit for configuring a wireless sensor network10 and may be configured by assigning a geographical code (GGC) to sensor nodes existing in a particular region. As an example, each of the clusters 200 may be distinguished by using a different cluster identification (CID).

The present invention provides for the GGC to control the wireless sensor network 10. The GGC is data for displaying location information being mapped with a geographic area to provide a location-based service. The GGC preferably includes geographical local information and figures corresponding to the geographical local information. The GGC may be allocated by considering a range covered by a sensor node.

The GGC has a hierarchy structure similar to a postal code used by the postal service. Radio resources in the wireless sensor network may be allocated using a centralized media access control (MAC) method. The wireless sensor network may be a network which may use location information such as Global Positioning System (GPS) information and Geo-Graphic Code (GGC) information. Specifically, for example, the apparatus for allocating a radio resource in a wireless sensor network may be applicable to an Institute of Electrical and Electronics Engineers (IEEE) 802.15-based sensor network. However, the present invention is not limited to the above-described examples. Also, the present invention may be applicable to every wireless sensor network using the centralized MAC method.

Figure 2:
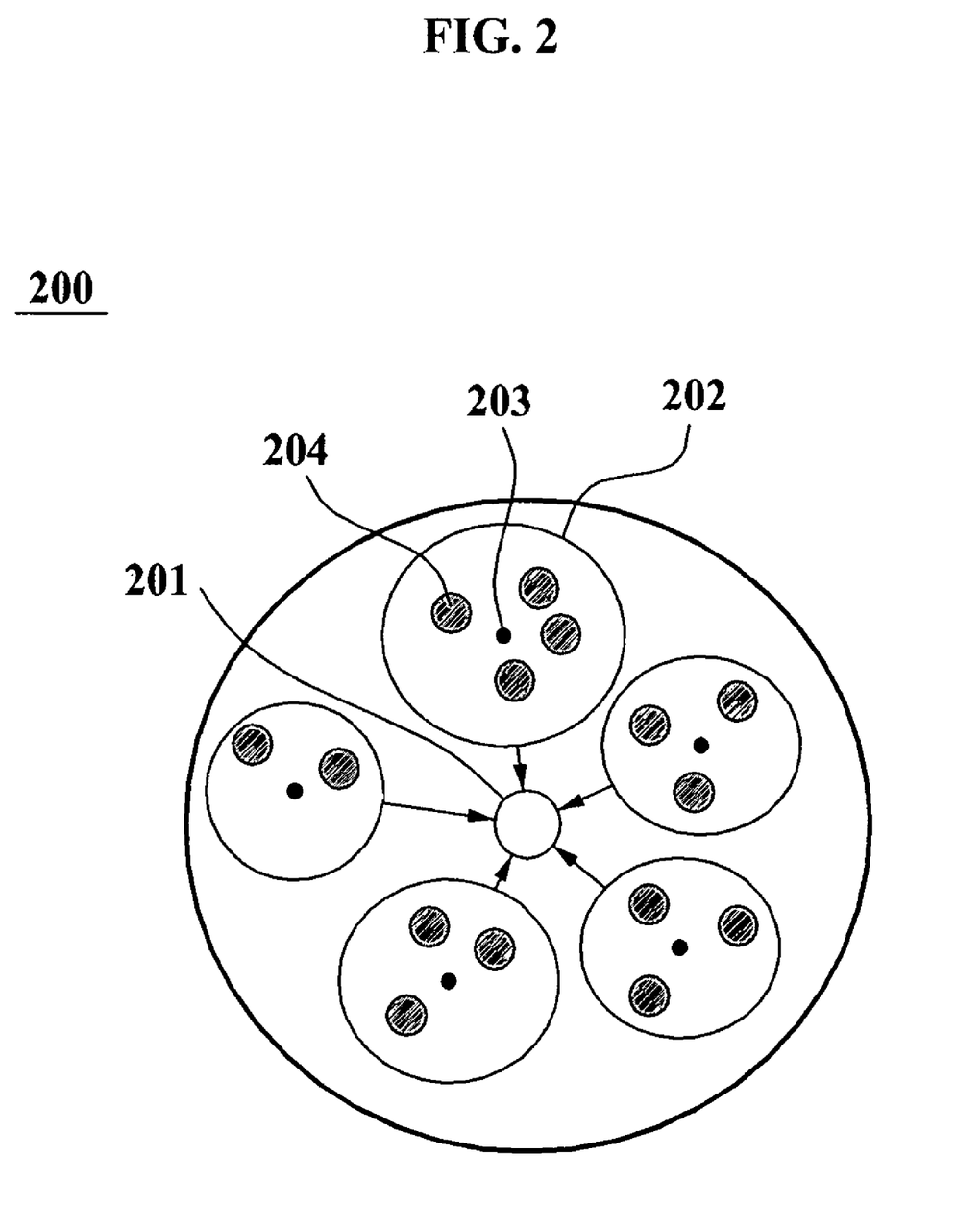
FIG. 2 is a configuration diagram illustrating a cluster of FIG. 1.

FIG. 2 is a configuration diagram illustrating a cluster 200 of FIG. 1.

As illustrated in FIG. 2, a cluster 200 may include a single cluster header 201 and a plurality of zones 202, and the plurality of zones 202 may each include a single reference point 203 and a plurality of sensor nodes 204.

The plurality of zones 202 within the cluster 200 may be used as a minimum unit to aggregate data. The cluster header 201 may manage a GGC of the plurality of zones 202, configuring the plurality of clusters 200 and a residual energy, and transmitting management information to the base station 100. The wireless sensor network can include a cluster header 201 and a plurality of zones 202. Each of the zones 202 may include at least one sensor node, hereinafter, a sensor 204. The cluster header 201 may recognize absolute or relative location information of all sensors 204 in a zone, which is controlled by the cluster header 201, by using the GPS information and the GGC information. The cluster header 201 groups a plurality of sensors 204 according to a predetermined purpose using the recognized location information. Also, the cluster header 201 collects location information of the grouped sensors, and defines a particular zone which is newly formed by the grouped sensors.

In an exemplary implementation of the present invention, a residual energy denotes a energy that can be supplied to a sensor node in the plurality of zones 202 so as to prospectively operate, for example, a power that can be prospectively supplied by a battery of each sensor node.

A total residual energy denotes a total amount of residual energy of a sensor node in the each of the plurality of zones 202, and an average residual energy denotes a value that the total residual energy is divided by a number of the sensor node in the each of the plurality of zones 202.

In an exemplary implementation of the present invention, the cluster header 201 does not directly transmit data being sensed by the plurality of sensor nodes 204 despite transmitting the management information to the base station 100.

Each zone 202 may include the single reference point 203 and the plurality of sensor nodes 204. The plurality of sensor nodes 204 may sense a physical phenomenon of surrounding environments. The single reference point 203 may assign the GGC to all of the plurality of sensor nodes 204 within radiuses of the single reference point 203, the GGC having location and range information.

In an exemplary implementation of the present invention, the radiuses of the reference point 203 may be formed to not overlap each other, and include all of the plurality of sensor nodes 204.

Also, the plurality of sensor nodes 204 have an identical location value with one another, and a spatial correlation is high with one another since an identical GGC is assigned from the single reference point 203. Accordingly, the present invention preferably provides for use of the zones 202 as units to aggregate data.

Figure 3:
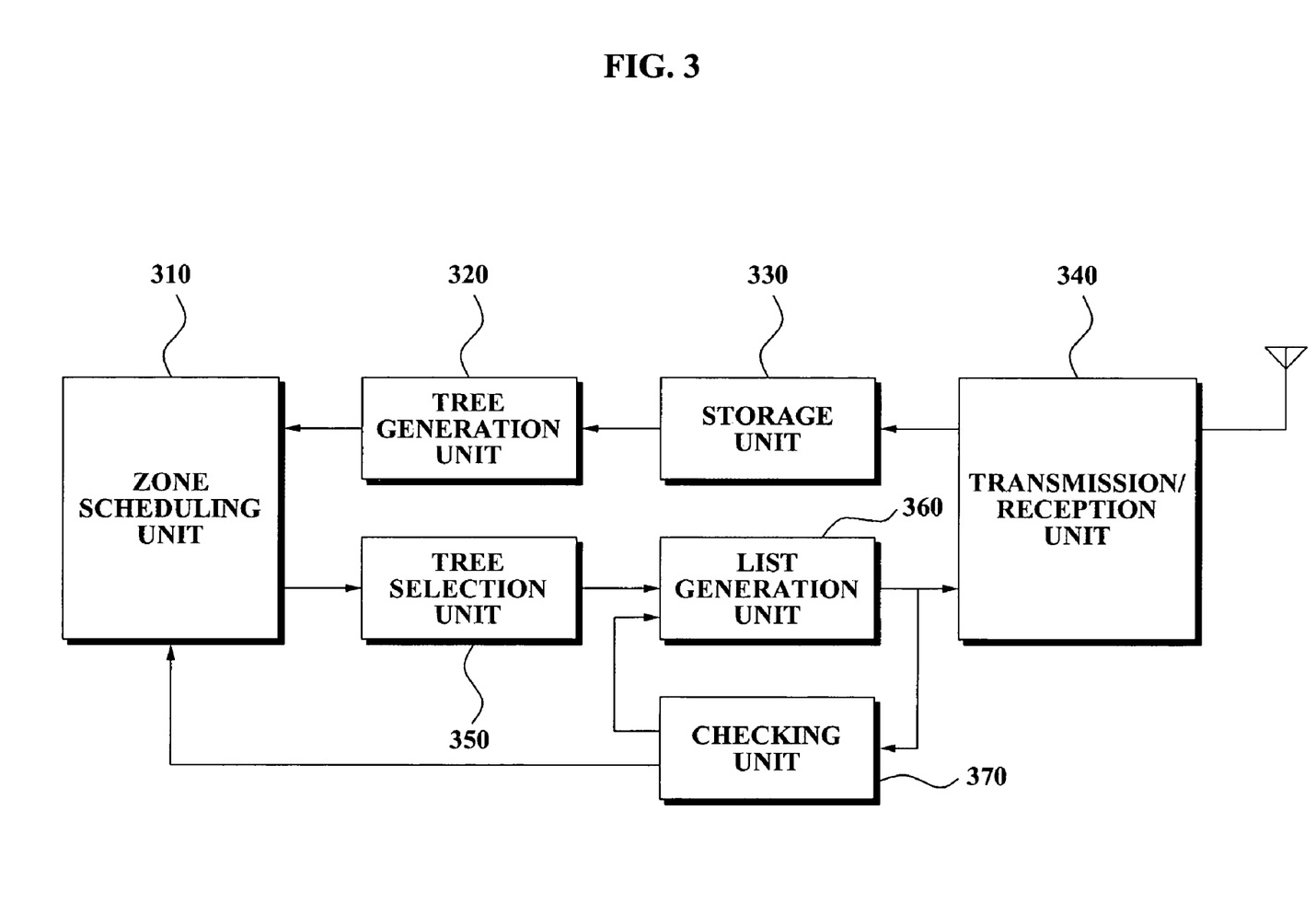
FIG. 3 is a configuration diagram illustrating a data aggregation apparatus according to an exemplary embodiment of the present invention.

FIG. 3 is a configuration diagram illustrating a data aggregation apparatus according to an exemplary embodiment of the present invention.

As illustrated in FIG. 3, the data aggregation apparatus according to the exemplary embodiment of the present invention may be included in a base station, and may include a zone scheduling unit 310, a tree generation unit 320, a storage unit 330, a transmission/reception unit 340, a tree selection unit 350, a list generation unit 360, and a checking unit 370.

The storage unit 330 may store management information being transmitted from a cluster header 201, that is, a GGC of a plurality of zones 202 configuring a plurality of clusters 200 and a residual energy. The tree generation unit 320 may generate a plurality of aggregation trees according to the connection relationships of clusters 200 that configure a wireless sensor network 10 using a GGC.

The zone scheduling unit 310 may select a single activation zone for each cluster 200 which configures each of the plurality of data aggregation trees.

The tree selection unit 350 may select a maximum energy tree having a maximum total residual energy from the plurality of data aggregation trees based on the activation zone. The list generation unit 360 may generate a tree list including activation zone information which corresponds to the maximum energy tree, and information about the maximum energy tree.

The checking unit 370 may check whether a zone having an average residual energy of zero exists using a estimated average residual energy with respect to all zones that correspond to the plurality of data aggregation trees being selected based on the tree list.

In an exemplary implementation of the present invention, the checking unit 370 outputs a control signal so that the zone scheduling unit performs the selecting of the activation zone when the zone having average residual energy of zero does not exist. The checking unit 370 outputs a control signal so that the list generation unit terminates the generating of the tree list when the zone having average residual energy of zero exists.

The transmission/reception unit 340 may receive management information from the cluster header 201, and may transmit the tree list in which the generation is terminated.

Figure 4:
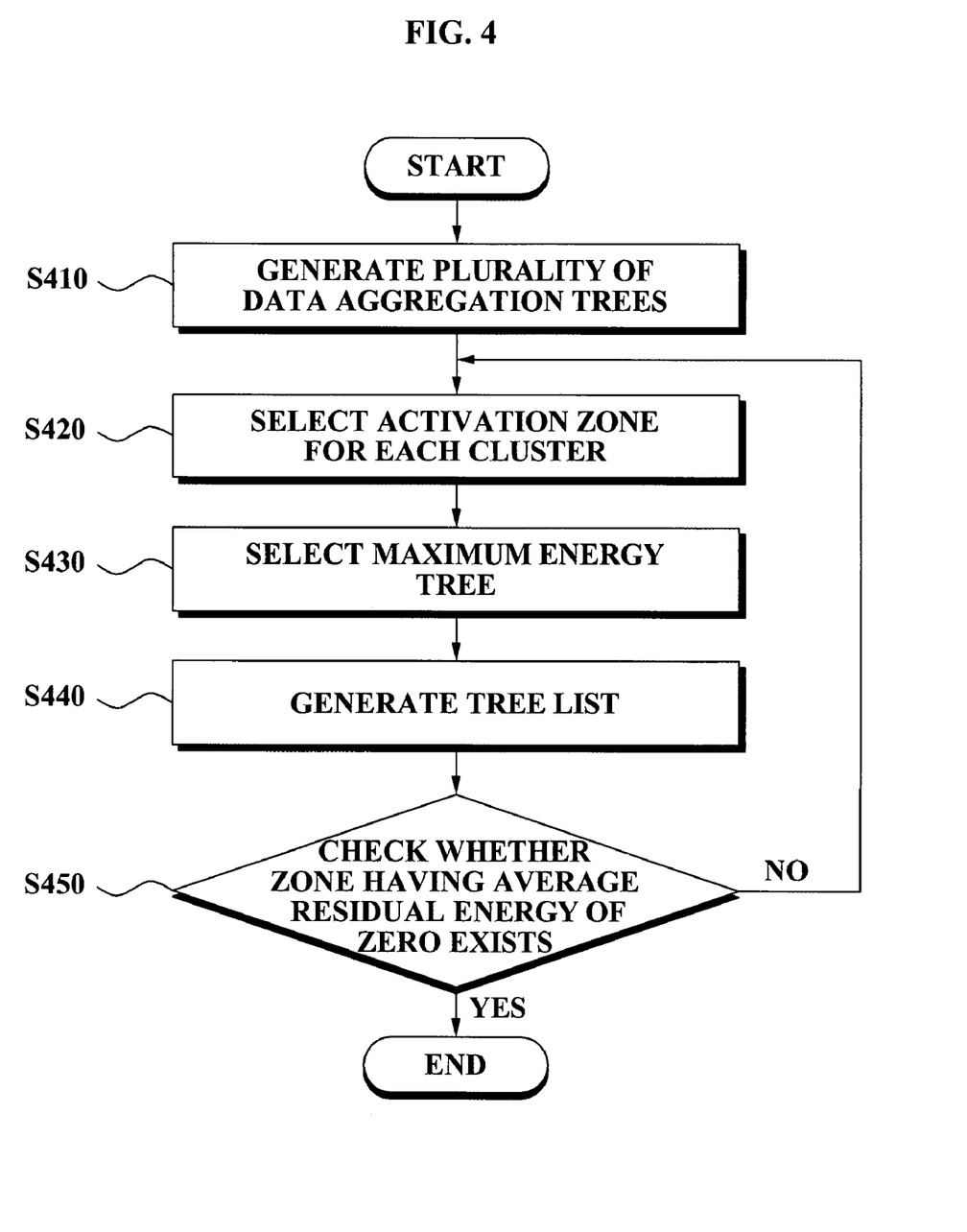
FIG. 4 is a flowchart illustrating a data aggregation method according to an exemplary embodiment of the present invention.

FIG. 4 is a flowchart illustrating a data aggregation method according to an exemplary embodiment of the present invention.

Hereinafter, the data aggregation method according to the exemplary embodiment of the present invention will be described in more detail.

In operation S410, the tree generation unit 320 may generate a plurality of data aggregation trees using a GGC, which will be described by referring to FIG. 5.

Figure 5:
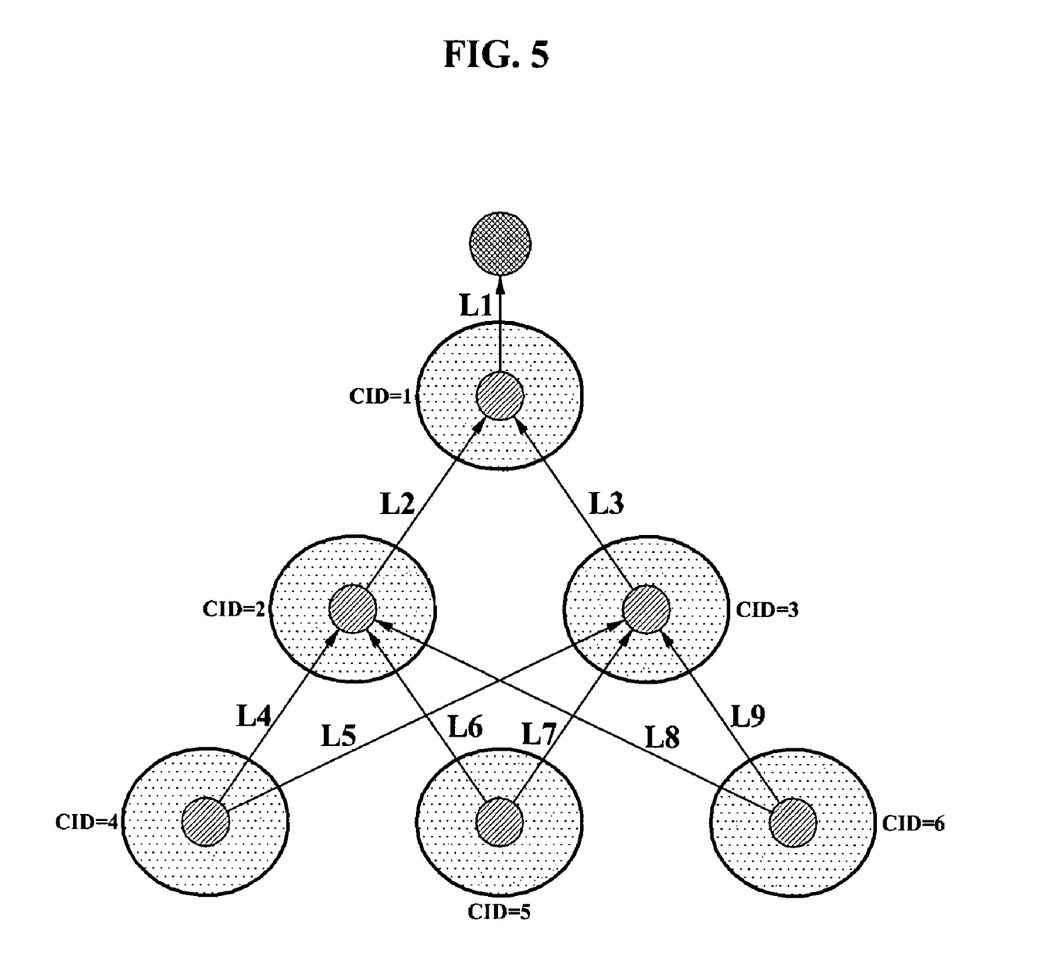
FIG. 5 is a configuration diagram illustrating a connection relation among clusters according to an exemplary embodiment of the present invention.

FIG. 5 is a configuration diagram illustrating a connection relationship among clusters according to an exemplary embodiment of the present invention.

As illustrated in FIG. 5, the tree generation unit 320 of FIG. 3 may assign each of the clusters a single level based on a distance between a base station and a cluster header configuring each of the clusters 200.

In an exemplary implementation of the present invention, the single level may be assigned to each of the clusters 200 according to a number of hops between the base station 100 and the cluster header 201.

As an example, level one is assigned to a cluster of CID=1, level two is assigned to clusters of CID=2 and 3, and level three is assigned to clusters of CID=4, 5, and 6.

The tree generation unit 320 of FIG. 3 may generate the plurality of aggregation trees according to links with respect to connection between the clusters being assigned the single level for data aggregation, the links being different from one another.

As an example, the different links L1 through L9 may be connected to between the base station 100 and the clusters 200. Specifically, a connection relationship among the clusters 200 may indicate a connection relationship among zones configuring the clusters 200. That is, connection relationships between each of the clusters may indicate connection relationships between zones configuring the each of the clusters. The links may be formed between a zone of the higher level cluster and a zone of the lower level cluster. Links are preferably not formed between zones of clusters in the same level.

Only a single link may preferably be connected between two clusters, and based on this scheme, an operation of generating a plurality of data aggregation trees will be described by referring to FIG. 6.

Figure 6:
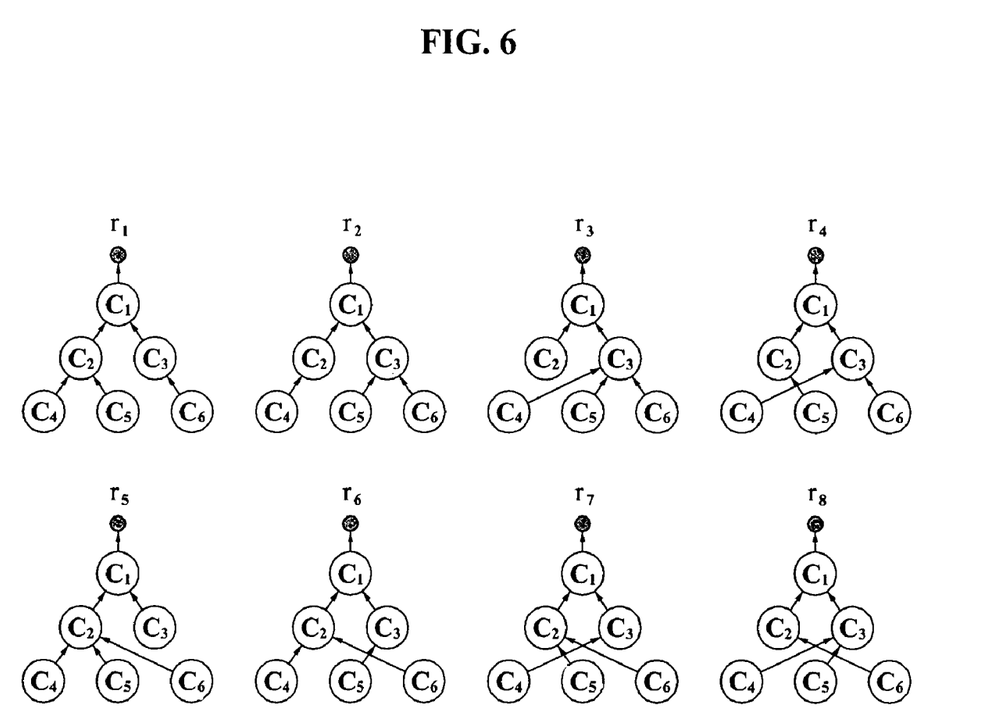
FIG. 6 is a diagram illustrating generation of a data aggregation tree according to an exemplary embodiment of the present invention.

FIG. 6 is a diagram illustrating generation of a data aggregation tree according to an exemplary embodiment of the present invention.

As illustrated in FIG. 6, the number of possible combinations of the data aggregation tree that may be generated may be calculated using a product of a repeated permutation, which is represented by, $$(N_1 \Pi N_2) \times (N_2 \Pi N_3) \times (N_3 \Pi N_4) \times \ldots = N_1^N \times N_2^N \times N_3^N \times \quad \text{[Equation 1]}$$

where Ni may indicate a number of clusters existing in level i. Referring back to FIG. 5, level one is assigned to one cluster, level two is assigned to two clusters, and level three is assigned to three clusters. Subsequently, the number of possible combinations of the data aggregation tree that may be generated correspond to $1^2 \times 2^3 = 8$.

The data aggregation tree according to an exemplary embodiment of the present invention may not be limited to an a-ary tree, and may be configured in various forms according to a range of a wireless sensor network 10 and a distance between a base station 100 and a cluster header 201.

The zone scheduling unit 310 of FIG. 3 may select a single activation zone for each of the clusters in operation S420. Namely, the zone scheduling unit 310 may perform scheduling based on an average residual energy of each zone configuring the clusters, which is to maximize a lifetime of a network by minimizing the average energy consumption of the clusters.

The zone scheduling unit 310 may estimate an average residual energy corresponding to each zone which configures the clusters. The zone scheduling unit 310 may also estimate the average residual energy according to a distance between a higher level cluster and the activation zone, which is connected to the higher level cluster to aggregate the data of the average residual energy of the activation zone and the number of sensor nodes configuring the activation zone.

Referring to FIG. 5, energy losses may differ depending on distance, where energy losses of a path is calculated as $$\sigma(L_x) = 1/[d(L_x)]^2 \quad \text{[Equation 2]}$$

where Lx indicates a link between zones, and d(Lx) indicates a distance of each link.

Power which is required to transmit data in each of the zones may be estimated using Equation 2. The power consumption may be calculated as $$P_t(L_x) = P_0/\sigma(L_x), P_0 = -34 \text{ dBm} \quad \text{[Equation 3]}$$

After each of the zones transmits the data, an average residual energy may be estimated using Equation 3. An average residual energy corresponding to a zone i in a cluster k may be calculated as $$\varepsilon_i^k(f+1) = \varepsilon_i^k(f) - \frac{(p_{ag} + P_{at})N_{in}(Z) + P_t(L_k) + P_{at}}{M_i} \quad \text{[Equation 4]}$$

where Pag may indicate a circuit energy required to aggregate the data. Pct may indicate a circuit energy required for a transmitter transmitting the data. Pcr may indicate a circuit energy required for a receiver receiving the data. Nin(Z) may indicate a number of links being connected to receive the data. Mi may indicate a number of sensor nodes configuring zones.

The zone scheduling unit 310 may estimate average residual energies of all zones configuring the clusters using Equation 4. The zone scheduling unit 310 may select an activation zone having an average residual energy of a maximum for each of the clusters based on the estimated average residual energy, which may be calculated as $$\epsilon_j^k(f+1) = \max(\epsilon_i^k(f+1)) \quad \text{[Equation 5]}$$

In an exemplary implementation, the zone scheduling unit 310 selects the activation zone from a highest level cluster, in operation S420 of FIG. 4, and sequentially selects the single activation zone in an order from a highest level cluster to a lowest level cluster based on the selected activation zone.

Also, the zone scheduling unit 310 may estimate an average residual energy with respect to non-activation zones, which are not selected, from the zones configuring the clusters, which may be calculated as $$\varepsilon_i^k(f+1) = \varepsilon_i^k(f) - \frac{P_{sleep}}{M_i} \quad \text{[Equation 6]}$$

where Psleep may indicate a circuit energy which is required when a zone is in a non-activation mode.

The tree selection unit 350 of FIG. 3 may estimate a total residual energy for each of the plurality of data aggregation trees based on the selected activation zone. The total residual energy may be acquired by using Equation 7 after calculations using Equations 5 and 6.

$$E_{AT}(f+1) = \sum_k \left( \sum_i \varepsilon_i^k(f+1) + \varepsilon_j^k(f+1) \right) \quad \text{[Equation 7]}$$

where $\epsilon_j^k(f+1)$ may indicate an average residual energy of the activation zone, and $\epsilon_i^k(f+1)$ may indicate an average residual energy of the non-activation zone.

The tree selection unit 350 may select a maximum energy tree having a maximum total residual energy, from the plurality of data aggregation trees, in operation S430.

The list generation unit 360 of FIG. 3 may generate a tree list including activation zone information which corresponds to information about the maximum energy tree and the maximum energy tree in operation S440, which will be described by referring to FIG. 7.

Figure 7:
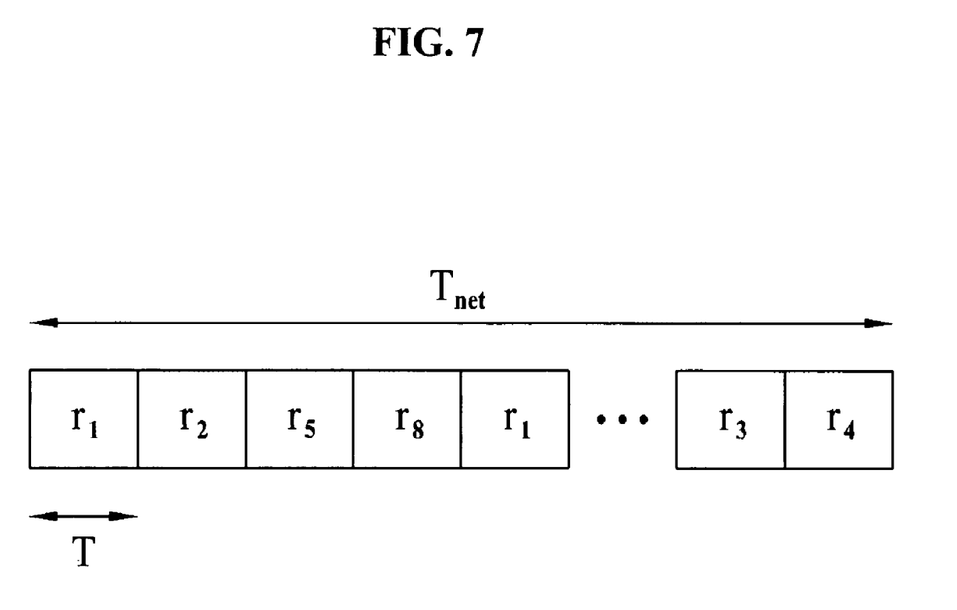
FIG. 7 is a diagram illustrating an operation of generating a tree list according to an exemplary embodiment of the present invention.

FIG. 7 is a diagram illustrating an operation of generating a tree list according to an exemplary embodiment of the present invention.

As illustrated in FIG. 7, a tree list may include at least one maximum energy tree, the at least one maximum energy tree being activated preferably for a predetermined time T during Tnet time corresponding to a lifetime of a wireless network. That is, a single maximum energy tree may be allocated to a single time slot.

The maximum energy tree included in the tree list may be applied to the wireless sensor network preferably for a predetermined time. Specifically, the base station 100 of FIG. 1 may activate activation zones included in the maximum energy tree preferably for the predetermined time. The base station 100 may aggregate data from zones for the predetermined time.

In an exemplary implementation of the present invention, the data may indicate data being sensed by sensor nodes which configure the activation zone.

The base station 100 may terminate data aggregation when any single zone of the plurality of zones begins to have an average residual energy of zero. For this, the checking unit 370 of FIG. 2 may check whether a zone having an average residual energy of zero exists in operation S450.

The checking unit 370 of FIG. 3 may output a control signal so that the zone scheduling unit 310 of FIG. 3 performs an operation of selecting an activation zone when a zone having an average residual energy of zero does not exist. Subsequently, an operation of selecting a new maximum energy tree may be performed.

Also, the checking unit 370 may output a control signal so that the list generation unit 360 of FIG. 3 terminates an operation of generating the tree list when a zone having an average residual energy of zero exists.

The transmission/reception unit 340 of FIG. 3 may receive management information from a cluster header, and also may transmit the tree list being received from the list generation unit 360 to the cluster header.

Figure 8:
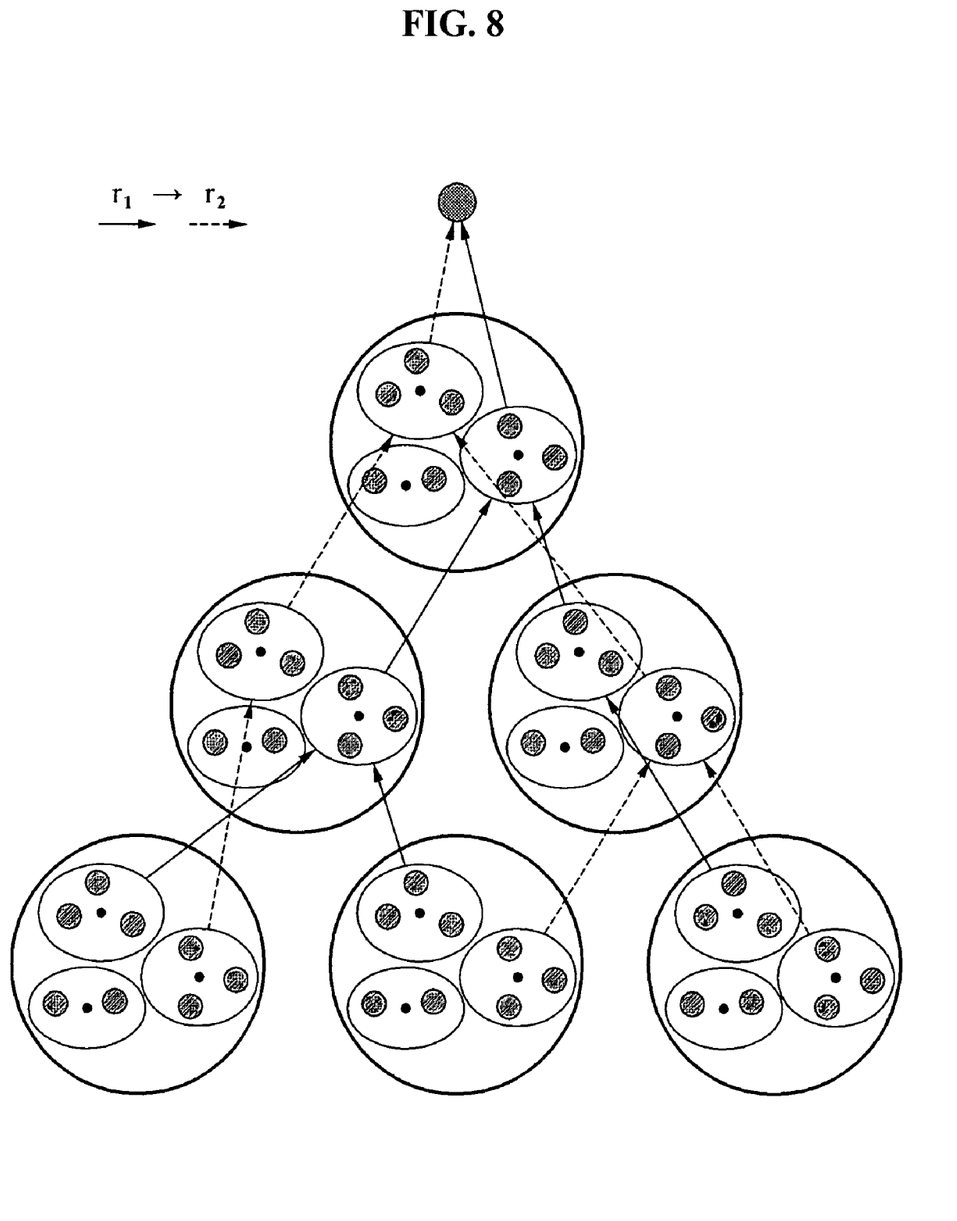
FIG. 8 is a diagram illustrating changes of a data aggregation tree according to an exemplary embodiment of the present invention.

FIG. 8 is a diagram illustrating changes of a data aggregation tree according to an embodiment of the present invention.

As illustrated in FIG. 8, when a maximum energy tree is changed according to a tree list, activation zones corresponding to the changed maximum energy tree may be activated.

Referring to FIG. 8, a data aggregation tree is changed from r1 to r2, activation zones may be changed as a result of the changed data aggregation tree, and subsequently, links among each activation zone may be changed.

A wireless sensor network 10 according to an exemplary embodiment of the present invention may activate all sensor nodes configuring an activation zone preferably only for a predetermined time. Since the all sensor nodes are changed to a sleep mode for a time besides the predetermined time, energy consumption of the all sensor nodes may be minimized.

A data aggregation method and apparatus using the method using zone scheduling on a wireless sensor network may be applied to a wireless communication system 10, and also may be applied to a wired communication system and a combined wired and wireless communication system.

The data aggregation method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention. Also, functional programs, codes, and code segments for accomplishing the present invention can be easily construed as within the scope of the invention by programmers skilled in the art to which the present invention pertains.

According to exemplary embodiments of the present invention, it is possible to improve a lifetime of an entire network 10 since any single zone 202 selectively transmits data using zone scheduling, from a plurality of zone configuring clusters 200.

Also, according to exemplary embodiments of the present invention, it is possible to easily understand location information of all sensor nodes 204 by assigning information of a GGC to each node 204 of a plurality of nodes configuring a zone 202.

Also, according to exemplary embodiments of the present invention, it is possible to be easily applied to expand a network since a wireless sensor network 10 is configured with a plurality of clusters 200, the plurality of clusters are configured with a plurality of zones, the plurality of zones 202 are configured with a plurality of sensor nodes 204 by hierarchically configuring a wireless sensor network using clusters, zones, and sensor nodes.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A data aggregation method comprising:
generating a plurality of data aggregation trees according to a connection relationship of clusters of sensor nodes which configures a wireless sensor network using a geographical code (GGC);
selecting a single activation zone for each of the clusters which configures each of the plurality of data aggregation trees;
selecting a maximum energy tree, the maximum energy tree corresponding to one of the plurality of data aggregation trees having a maximum total residual energy based on the single activation zone; and
generating a tree list including activation zone information which corresponds to the maximum energy tree, and information about the maximum energy tree.

2. The data aggregation method of claim 1, wherein the generating of the plurality of data aggregation trees comprises:

assigning each of the clusters a single level based on a distance between a base station and a cluster header for configuring each of the clusters; and
generating the plurality of data aggregation trees according to links with respect to connection between each of the clusters being assigned the single level for data aggregation, the links being different from one another.

3. The data aggregation method of claim 2, wherein clusters are assigned to one of a higher level and a lower level, and wherein the different links are formed between a higher level cluster and a lower level cluster to aggregate the data.

4. The data aggregation method of claim 1, wherein the selecting of the single activation zone comprises:
estimating an average residual energy corresponding to zones that constitute each of the clusters; and
selecting, for each of the clusters, the corresponding zone having maximum average residual energy as the activation zone based on the estimated average residual energy.

5. The data aggregation method of claim 4, wherein clusters are assigned to one of a higher level and a lower level, and wherein the estimating of the average residual energy estimates the average residual energy according to a distance between a higher level cluster and the activation zone being connected to the higher level cluster to aggregate the data of the average residual energy of the activation zone and the number of sensor nodes configuring the activation zone.

6. The data aggregation method of claim 4, wherein the clusters are assigned to different levels, and wherein the selecting of the single activation zone selects the single activation zone from a highest level cluster, and sequentially selects the single activation zone in an order from the highest level cluster to a lowest level cluster based on the selected activation zone.

7. The data aggregation method of claim 4, further comprising:
estimating an average residual energy with respect to non-activation zones, which are not selected, from the zones configuring each of the clusters.

8. The data aggregation method of claim 1, further comprising:
checking whether a zone having an average residual energy of zero exists, from an estimated average residual energy with respect to all zones corresponding to the plurality of data aggregation trees being selected based on the tree list.

9. The data aggregation method of claim 8, wherein the checking of whether the zone having the average residual energy of zero exists repeatedly performs operations from the selecting of the activation zone when the zone having the average residual energy of zero does not exist, and terminates the generating of the tree list when the zone having the average residual energy of zero exists.

10. The data aggregation method of claim 1, wherein the wireless sensor network comprises a plurality of the clusters using the GGC, the plurality of the clusters comprise a single cluster header and a plurality of the zones, and the plurality of the zones comprise a single reference point and a plurality of the sensor nodes.

11. The data aggregation method of claim 10, wherein the GGC is data displaying location information being mapped with a geographic area to provide a location based service.

12. A computer-readable storage medium storing a program for implementing a data aggregation method, the method comprising:

generating a plurality of data aggregation trees according to a connection relationship of clusters of sensor nodes which configures a wireless sensor network using a geographical code (GGC);

selecting a single activation zone for each of the clusters which configures each of the plurality of data aggregation trees;

selecting a maximum energy tree, the maximum energy tree corresponding to one of the plurality of data aggregation trees having a maximum total residual energy based on the single activation zone; and generating a tree list including activation zone information which corresponds to the maximum energy tree, and information about the maximum energy tree.

13. A data aggregation apparatus comprising:

a tree generation unit for generating a plurality of data aggregation trees according to an association of clusters of sensor nodes in a wireless sensor network using a geographical code (GGC);

a zone scheduling unit for selecting a single activation zone for each of the clusters which configures each of the plurality of data aggregation trees;

a tree selection unit for selecting a maximum energy tree having a maximum total residual energy from the plurality of data aggregation trees based on the activation zone; and a list generation unit for generating a tree list including activation zone information which corresponds to the maximum energy tree, and information about the maximum energy tree.

14. The data aggregation apparatus of claim 13, wherein the tree generation unit assigns each of the clusters a single level based on a distance between a base station and a cluster header configuring each of the clusters, and generates the plurality of data aggregation trees according to links with respect to connection between each of the clusters being assigned the single level for data aggregation, the links being different from one another.

15. The data aggregation apparatus of claim 14, wherein the links are formed between a higher level cluster and a lower level cluster to aggregate the data.

16. The data aggregation apparatus of claim 13, wherein the zone scheduling unit estimates an average residual energy corresponding to each zone which configures each of the clusters, and selects, for each of the clusters, the zone having maximum average residual energy as the activation zone based on the estimated average residual energy.

17. The data aggregation apparatus of claim 16, wherein the zone scheduling unit estimates the average residual energy according to a distance between a higher level cluster and the activation zone being connected to the higher level cluster to aggregate the data of the average residual energy of the activation zone and the number of sensor nodes configuring the activation zone.

18. The data aggregation apparatus of claim 16, wherein the zone scheduling unit selects the single activation zone from a highest level cluster, and sequentially selects the single activation zone in an order from the highest level cluster to a lowest level cluster based on the selected activation zone.

19. The data aggregation apparatus of claim 16, wherein the zone scheduling unit estimates an average residual energy with respect to non-activation zones, which are not selected from the zones configuring each of the clusters.

20. The data aggregation apparatus of claim 13, further comprising:

a check unit for checking whether a zone having an average residual energy of zero exists, from an estimated average residual energy with respect to all zones corresponding to the plurality of data aggregation trees being selected based on the tree list.

21. The data aggregation apparatus of claim 20, wherein the checking unit outputs a control signal so that the zone scheduling unit performs the selecting of the activation zone when the zone having the average residual energy of zero does not exist, and outputs a control signal so that the list generation unit terminates the generating of the tree list when the zone having the average residual energy of zero exists.

22. The data aggregation apparatus of claim 13, wherein the wireless sensor network comprises a plurality of the clusters using the GGC, the plurality of the clusters comprise a single cluster header and a plurality of the zones, and the plurality of the zones comprise a single reference point and a plurality of the sensor nodes.

23. The data aggregation apparatus of claim 22, wherein the GGC is data displaying location information being mapped with a geographic area to provide a location based service.

* * * * *